United States Patent [19]

Overbeek

[11] 4,361,216

[45] Nov. 30, 1982

[54] ROLLER CLUTCH ACTUATOR

[75] Inventor: Robert B. Overbeek, Rochelle, Ill.

[73] Assignee: Dana Corporation, Toledo, Ohio

[21] Appl. No.: 149,068

[22] Filed: May 12, 1980

[51] Int. Cl.³ ............................................ F16D 41/10
[52] U.S. Cl. ..................................... 192/36; 192/38; 192/44
[58] Field of Search ....................... 192/35, 36, 38, 44

[56] References Cited

U.S. PATENT DOCUMENTS

| 3,055,471 | 9/1962 | Warn et al. | 192/45 |
| 3,123,169 | 3/1964 | Young et al. | 192/36 X |
| 3,344,686 | 10/1967 | Baker | 192/35 X |
| 3,414,096 | 12/1968 | Reed | 192/38 |
| 3,472,349 | 10/1969 | Ainsworth | 192/35 |
| 4,076,108 | 2/1978 | Fogelberg | 192/35 |

Primary Examiner—Allan D. Herrmann
Attorney, Agent, or Firm—Frank B. McDonald

[57] ABSTRACT

An actuator system for a two-way overrunning roller clutch system includes a resilient torque transfer element which couples a wheel spindle and an aactuator ring. The torque transfer element minimizes potential damage due to misalignment between actuator and spindle parts. The actuator ring is banded by coiled garter springs to provide for frictional resilient engagement thereof with a clutch friction ring, the latter having its external circumference in mating contact with the internal circumference of the actuator ring. The degree of friction between the actuator and friction rings is controlled by garter spring tension to produce desired clutch actuation response.

10 Claims, 8 Drawing Figures

ROLLER CLUTCH ACTUATOR

BACKGROUND

This invention relates to roller clutch systems of the type for driving a wheel hub about a wheel spindle. More particularly, the invention relates to actuator systems for engagement or lockup of such roller clutches.

Characteristic of prior art devices is a lack of flexibility with respect to alignment between spindle, actuator, and hub parts. The result has been a significant potential for damage to the roller clutch assembly during its operation. For example, unless conventional actuator and friction rings are carefully aligned, high spots are created on the rings which shorten useful life of the actuator system. In addition, misalignment of the rings gives rise to a non-uniform loading on the clutch cage causing premature wear of the clutch rollers.

Moreover, rather cumbersome actuation systems have been employed in prior art devices. For example, U.S. Pat. No. 3,472,349 discloses a two-way overrunning roller clutch system which utilizes a system of ball detents and buttons for inducement of momentary cage drag. Such systems are expensive and do not lend themselves to simple adjustment, particularly after the unit is fully assembled and in use.

SUMMARY OF INVENTION

The roller clutch actuator of this invention is preferably for use in front drive roller clutch systems. A C-shaped actuator ring has its internal circumference in resilient engagement with the external circumference of a friction ring, the latter preferably an extension of the clutch cage. The actuator ring is banded by a plurality of garter springs which provide a medium for adjustment of frictional forces between actuator and friction rings for proper actuation response. The actuator ring is coupled to a resilient torque transfer element which in turn is coupled to a spindle lock washer fixed to the wheel spindle. The torque transfer element provides a flexibility which will prevent and/or minimize the effects of misalignment between actuator and spindle parts, and thus reduces potential damage to the roller clutch assembly. In addition, the novel arrangement of friction and actuator rings encircled by a plurality of garter springs provides a simple friction control medium in the actuator system.

DETAILED DESCRIPTION

Figure 1:
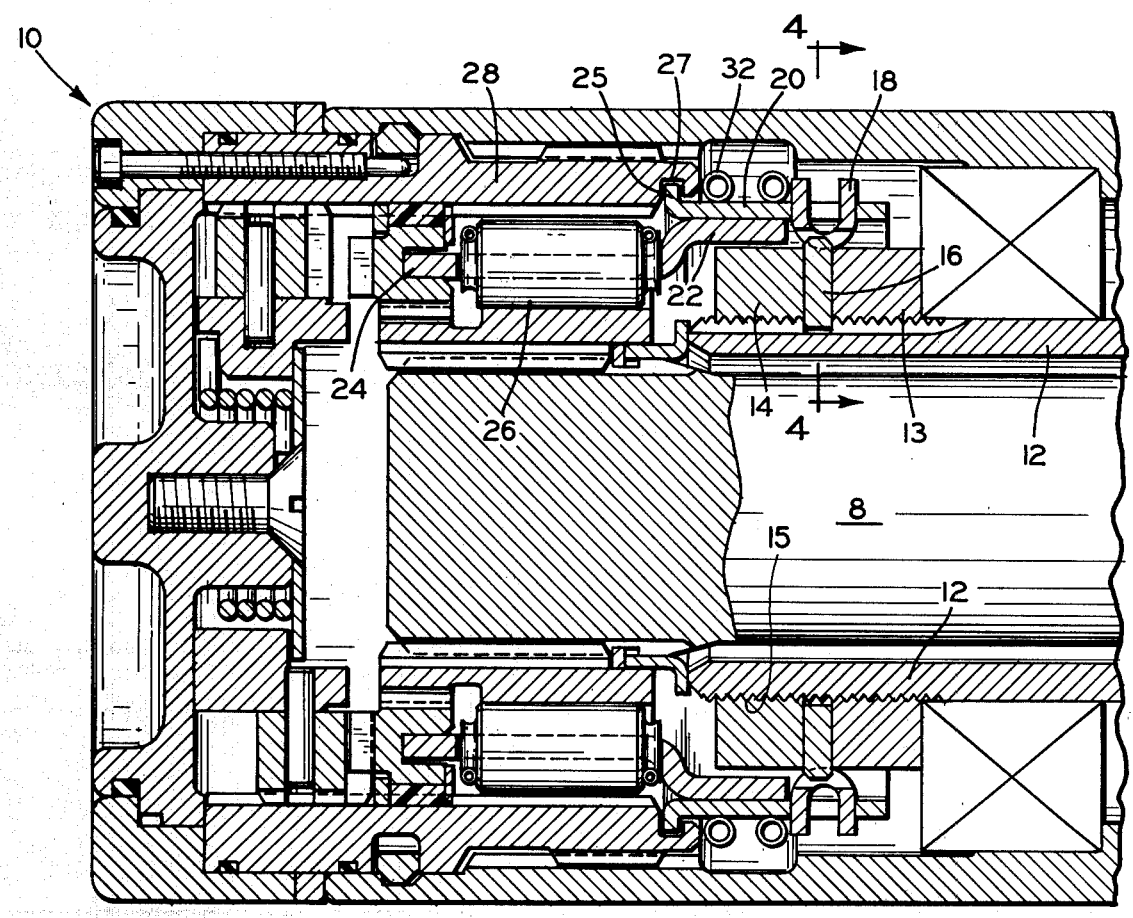
FIG. 1 is a cross-section assembly view of a roller clutch which incorporates the actuator of this invention.
Figure 3:
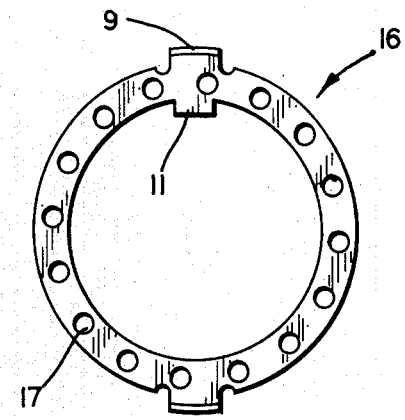
FIG. 3 is a face view of the retaining nut lock of this invention.

FIG. 1 depicts a two-way overrunning roller clutch system 10 of the type used in front drive vehicles and which employs the actuator of this invention. A wheel spindle 12 houses a drive axle 8, as per conventional practice. However, the wheel spindle 12 also carries an inner and outer spindle nut 13 and 14, respectively, between which is located a retaining nut lock 16. The retaining nut lock 16, as shown in FIG. 3, contains a tab 11 which engages a keyway (FIG. 4) in the spindle 12. The nut lock is installed as follows. The inner spindle nut 13 is first threaded over the outer threaded portion 15 of the spindle 12. The inner spindle nut 13 contains a pin (not shown) which extends axially for insertion into one of the pin holes 17 of the nut lock 16. Since the tab 11 fixes the angular relationship of the nut lock to the spindle, the inner spindle nut 13 must be accordingly adjusted for insertion of the aforesaid pin into one of the pin holes 17, which then also fixes the inner spindle nut 13. Next the outer spindle nut is threaded over the spindle to engage the nut lock and torqued thereagainst for rigid securement of the nut lock 16.

Figure 2A:
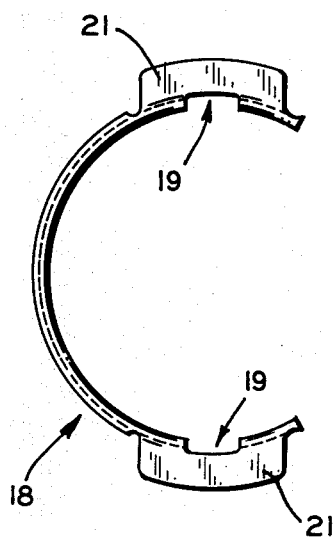
FIGS. 2a and 2b are face and side views of the resilient torque transfer element of this invention.
Figure 2B:
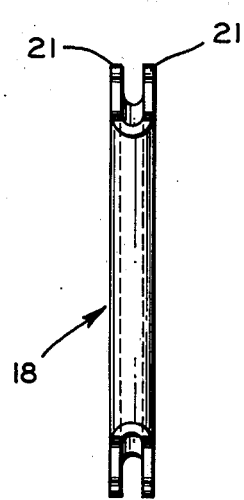
Figure 5:
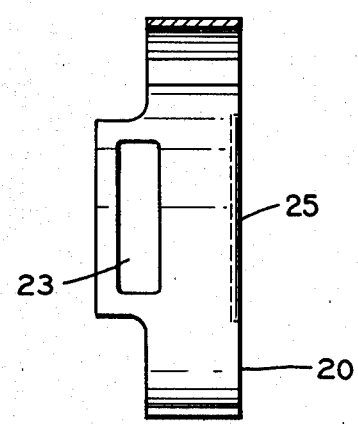
FIG. 5 is a cross-section top view of the actuator ring employed in this invention.

Ears 9 on the nut lock 16 engage a torque transfer element 18 via insertion of said ears into detents 19. FIGS. 2a and 2b more clearly show the torque transfer element 18 which couples to the nut lock 16 by detents 19. The preferred embodiment of the torque transfer element is a C-shaped circumferential ring which also contains tangs 21 as well as the aforesaid detents. The tangs 21 of the torque transfer element 18 insert into the actuator ring 20 through slots 23 (FIG. 5).

Figure 4:
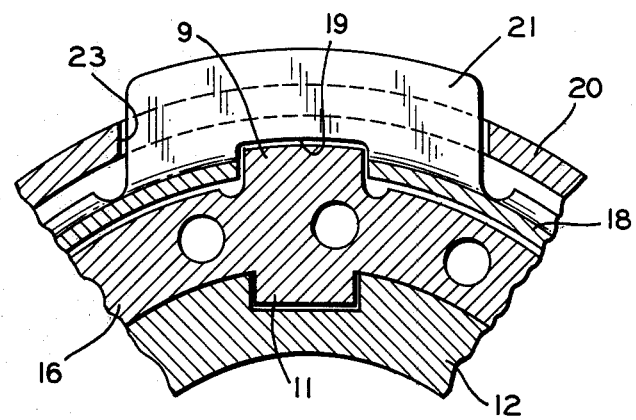
FIG. 4 is a cross-section view along lines 4—4 of FIG. 1.

A radial view of the positional relationships between the nut lock 16, torque transfer element 18, and actuator ring 20 is shown in FIG. 4. As apparent the torque transfer element 18 provides for a resiliency which would not be realized via a direct connection between the actuator ring 20 and nut lock 16.

It should also be pointed out that the present nut lock-spindle nut arrangement was found to solve a long standing problem of a prior art device used by this inventor. Thus in a roller clutch actuator having a friction ring keyed into an axial slot of a single spindle nut, the nut would become loosened on the spindle over a period of time by the actuator forces on the nut. The present invention therefore not only provides the resiliency needed for correction of installation misalignments, but also ensures that the actuator braking forces do not loosen the spindle nuts.

Referring back to FIG. 1, the actuator ring 20 includes a locating flange 25 which axially positions the ring by locating it in a recess 27 of the outer race. As apparent in FIG. 4, the torque transfer element 18 is resiliently coupled with the actuator ring 20, which in turn is in contact at all times with a friction ring 22 (FIG. 1). In the preferred embodiment the friction ring 22 is a bell-shaped extension of the roller cage 24.

Figure 6:
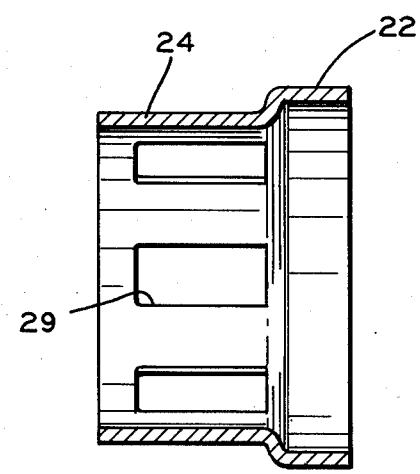
FIG. 6 is a cross-section view of the roller clutch cage of this invention.
Figure 7:
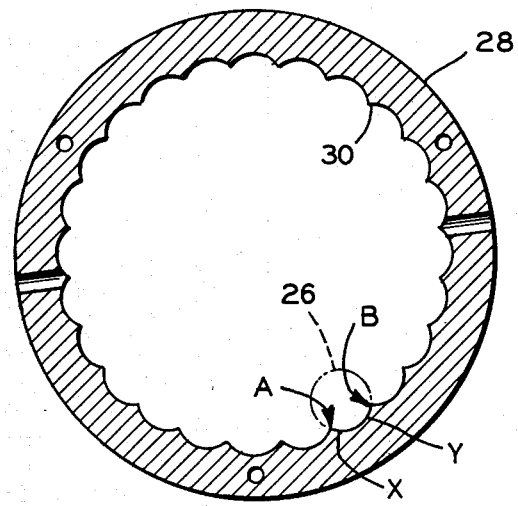
FIG. 7 is a cross-section view of the outer race of the roller clutch system which incorporates this invention.

FIG. 6 is a view of the roller cage which includes roller slots 29 in addition to the integral bell-shaped extension which forms the friction ring 22. The roller slots 29 locate the rollers 26 of the roller clutch system 10 in a circumferentially spaced relationship about the spindle 12. Radially outwardly of rollers 26 is an outer race 28 which, shown more clearly in FIG. 7, contains a plurality of ramps X and Y for rollers 26 which are utilized during roller clutch engagement or lockup. The ramps generate a circularly scalloped profile 30 within the outer race 28 as shown in FIG. 7, for mating with individual roller 26. A plurality of garter springs 32 encircle the actuator ring and provide a friction control medium between the actuator ring 20 and the friction ring 22.

As will be apparent to those skilled in this art, in the wheel hub overrunning mode the rollers 26 (FIG. 7) remain centrally positioned between points A and B, which are the uppermost points of the ramps X and Y respectively on either side of center of each roller. In the overrunning mode there is no relative movement between the actuator ring 20 and the friction ring 22 (FIG. 1). In the driving mode, however, the drive axle 8 momentarily overspeeds the wheel hub, producing relative movement between the rings, and resulting in a momentary drag on the roller cage 24 via the frictional resistance between rings 20 and 22. A momentary securement of the cage results, causing rollers 26 to ride up either ramp X or Y depending on the direction of spindle wheel movement, either clockwise or counter-clockwise (FIG. 7). Once the rollers 26 move up either ramps X or Y, the effect will be to lockup the roller clutch, as will be appreciated by those skilled in this art. During the driving mode there is constant relative movement between actuator and friction rings. Balance between too much and too little friction between the rings is very difficult to achieve in conventional actuation devices. Too much friction causes premature wear; too little creates poor actuation response. In this invention, however, garter springs 32 may be changed for achieving friction control as a function of spring tension even after the total clutch unit has been assembled, and without major effort. The simple change capability provided herein will insure ease of achieving and maintaining satisfactory actuation response of the roller clutch system over its full useful life.

What is claimed is:

1. In a roller clutch system for driving a wheel hub about a wheel spindle, said system including a cage containing a plurality of rollers circumferentially spaced about the wheel spindle, said cage positioned intermediate of said spindle and said wheel hub, said cage including a friction ring and an actuator ring in resilient frictional engagement with said friction ring; an improvement comprising a torque transfer ring resiliently coupling said actuator ring to said spindle, and means for frictionally biasing said actuator ring against said friction ring.

2. The roller clutch of claim 1 wherein said friction ring comprises an integral extension of said cage.

3. The roller clutch of claim 2 wherein the internal circumference of said actuator ring contacts the external circumference of said friction ring.

4. The roller clutch of claim 3 wherein said means for biasing comprises at least one coiled garter spring having its internal circumference in engagement with the external circumference of said actuator ring.

5. The roller clutch of claim 4 further comprising a retaining nut lock intermediate said wheel spindle and said torque transfer ring, said nut lock being axially and rotationally fixed to said spindle, said nut lock having means for the resilient coupling thereof with said torque transfer ring.

6. The roller clutch of claim 5 further comprising inner and outer spindle nuts torqued against the respective sides of said retaining nut lock for axial securement thereof on said spindle.

7. The roller clutch of claim 6 wherein said nut lock is keyed to said spindle to prevent angular rotation thereof about said spindle.

8. The roller clutch of claim 7 wherein said clutch provides for a two-way overrunning interconnection between said wheel spindle and said wheel hub.

9. The roller clutch of claim 8 wherein said torque transfer ring and actuator ring are both C-shaped, and wherein said integral friction ring is bell-shaped.

10. The roller clutch of claim 9 further comprising tangs on said torque transfer ring for resilient coupling thereof with said actuator ring, and further comprising detents in said torque transfer ring for the resilient coupling thereof with said retaining nut lock.

* * * * *